United States Patent [19]

Kimura

[11] 4,316,261
[45] Feb. 16, 1982

[54] DATA PROCESSING SYSTEM FOR A COM

[75] Inventor: Tsutomu Kimura, Asaka, Japan

[73] Assignee: Fuji Photo Film Co., Ltd., Minami-ashigara, Japan

[21] Appl. No.: 177,604

[22] Filed: Aug. 13, 1980

[30] Foreign Application Priority Data

Aug. 14, 1979 [JP] Japan .............................. 54/103393

[51] Int. Cl.³ .............................................. G06F 3/06
[52] U.S. Cl. .................................................... 364/900
[58] Field of Search ... 364/200 MS File, 900 MS File

[56] References Cited

U.S. PATENT DOCUMENTS

| | | | |
|---|---|---|---|
| 3,075,178 | 1/1963 | James | 364/900 |
| 3,546,681 | 12/1970 | Korn et al. | 364/900 |
| 3,623,008 | 11/1971 | Doblmaier et al. | 364/200 |

OTHER PUBLICATIONS

*COM Recording Formats*, Brochure National Micrographics Association, 1974, pp. 1,2,10 and 11.
*CRT vs. COM-Real Time vs. Real Enough Time*, Harrison et al., Nat'l Micrographics Assoc., RS 19-1976, pp. 30-37.
*COM Recorder Operations*, Brochure, Records Management Handbook, FPMR 101-11.5, 1975, pp. 16-22.

*Primary Examiner*—Harvey E. Springborn
*Attorney, Agent, or Firm*—Fleit & Jacobson

[57] ABSTRACT

In a computer output microfilmer (COM) comprising a computer output read out device having a magnetic recording tape, a central processor unit, and a recording unit, the computer output read-out device is provided with a buffer storage and a data processing device. The data read out from the magnetic recording tape are stored in the buffer storage and read out therefrom under the control of the data processing device. Thereby, the steps of reading out the data of page (N+2) from the magnetic recording tape, processing the data of page (N+1) in the central processor unit, and recording the data of page (N) in the recording unit are conducted in parallel.

3 Claims, 3 Drawing Figures

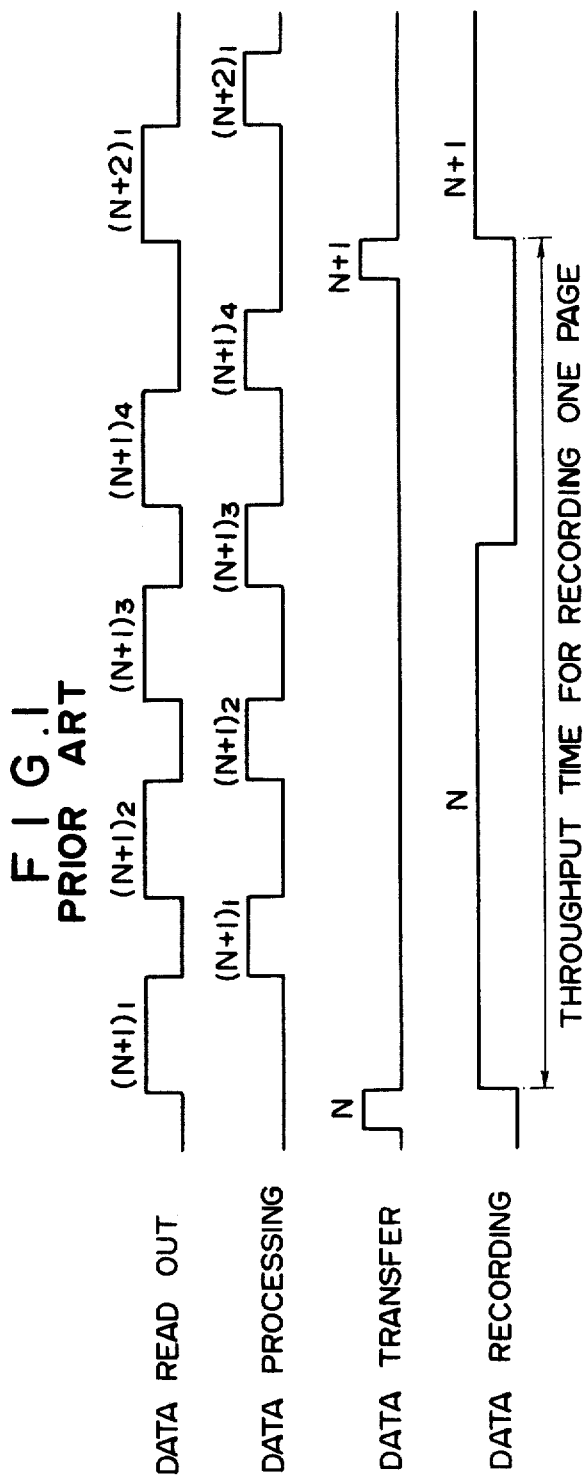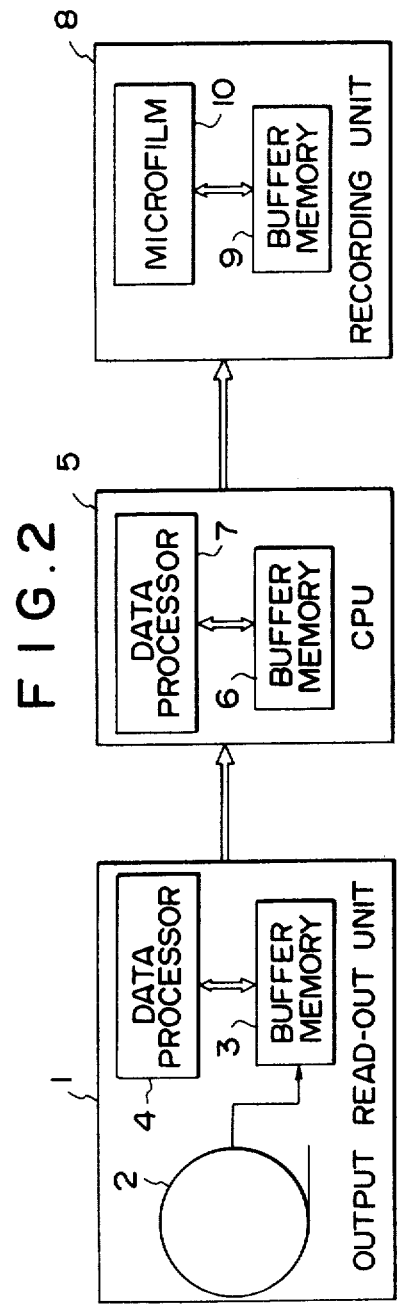

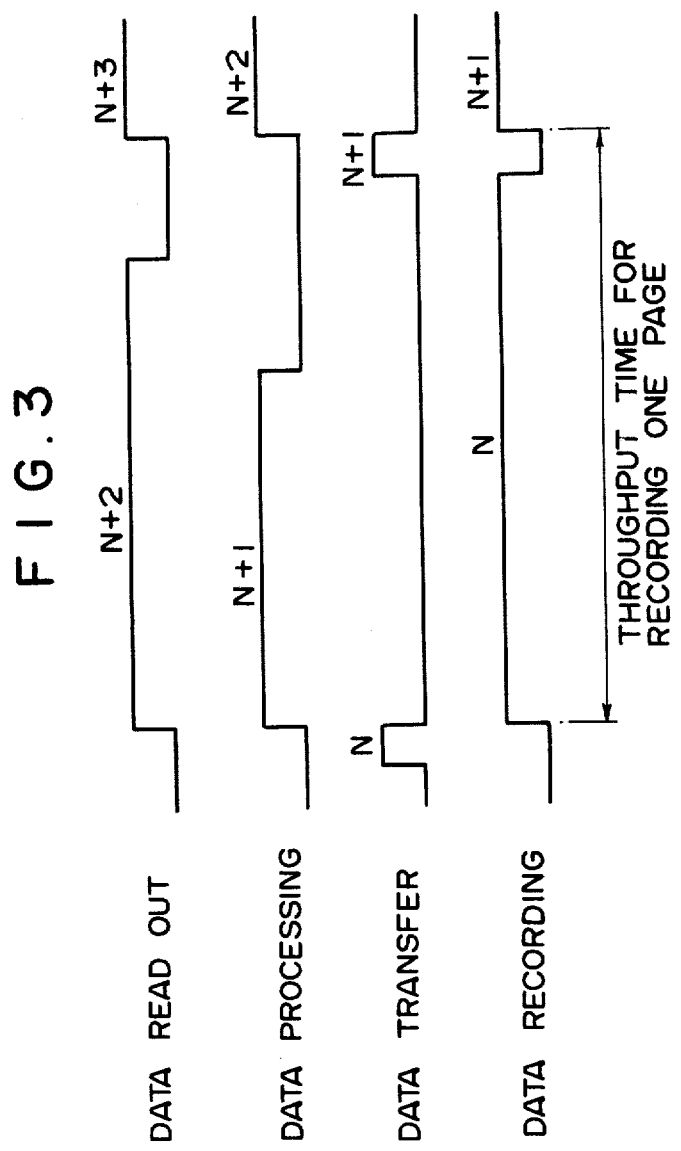

DATA PROCESSING SYSTEM FOR A COM

BACKGROUND OF THE INVENTION

1. Field of the Invention

This invention relates to a data processing system for handling the output from a computer so as to record the corresponding data on a microfilm device in a computer output microfilmer (COM).

2. Description of the Prior Art

A computer output microfilmer (hereinafter referred to as COM) is used as an output unit of a computer in the same manner that a line printer would be used. Generally, the COM is superior to other output units in that it is suitable for recording data at a high speed. Hence, it is desirable to make the best use of the merit of the COM or to further increase the recording speed thereof.

The COM is generally associated with a computer output read-out unit having a storage unit such as a magnetic recording tape, and a central processor unit (CPU) having a buffer storage. The COM (or recording unit) also has a buffer storage associated with it.

In a conventional data processing system used in conjunction with the COM, data stored in the storage unit are read out on a page by page basis from the computer output read-out unit, and are written directly into the buffer storage of the CPU. The data of one page are processed by the CPU and the processed data of the one page are transferred to the buffer storage of the recording unit to be stored therein. The recording unit (COM) reads out the data stored in the buffer storage thereof, and records the data on a microfilm by means of a laser beam scanning recorder, or an optical recording system using a cathode ray tube (CRT).

In the conventional system, the data is read out from the storage unit under the control of the CPU. Accordingly, the CPU is occupied in controlling the storage unit while the data is being read out, and reading data of one page and processing data of another page cannot be conducted in parallel. This increases the throughput time of the COM.

SUMMARY OF THE INVENTION

The primary object of the present invention is to provide an improved data processing system for a COM in which data recording of a page and data processing of a further page can be conducted in parallel with data read-out of a next page, whereby the entire data processing speed of the COM can be increased.

In accordance with the data processing system of the present invention, the computer output read-out unit is provided with a buffer memory and a data processing device. The buffer memory stores and reads out data from a storage unit, such as a magnetic recording tape, under the control of the data processing device in the read-out unit. Thus, data of one page read out from the magnetic recording tape are first stored in the buffer memory of the computer output read-out unit, and are then transferred to the buffer memory of the CPU, under the control of the data processing device in the read-out unit, rather than being directly stored in the latter buffer memory under the control of the CPU.

In this system, the CPU is not occupied in controlling the storage unit while the data of one page is being read therefrom, and, accordingly, the CPU is free to process data of the preceding page which has been already transferred to the buffer memory of the CPU.

BRIEF DESCRIPTION OF THE DRAWINGS

FIG. 1 is a timing chart illustrating the conventional data processing system for a COM, FIG. 2 is a block diagram illustrating the data processing system of the present invention, and FIG. 3 is a timing chart illustrating the operation of the data processing system of the present invention.

DETAILED DESCRIPTION OF THE INVENTION

Now the conventional data processing system in a COM will be described in more detail referring to FIG. 1 to clarify the system of the present invention.

In the conventional system, the data of page $(N+1)$ are read out and transferred from a magnetic recording tape to a buffer memory of a CPU in several lots, for example, in four lots $(N+1)_1$, $(N+1)_2$, $(N+1)_3$, $(N+1)_4$. Each lot of the data is stored in the buffer memory of the CPU and processed during the interval between the lots. After the fourth lot $(N+1)_4$ of the data of page $(N+1)$ are processed and before the first lot $(N+2)_1$ of the next page or page $(N+2)$ are read out from the magnetic recording tape, the processed data of page $(N+1)$ are transferred to a buffer memory of a recording unit to be stored therein. The recording unit reads out the data from the buffer memory thereof and records that data on a microfilm when the processed data of one page are wholly stored in the buffer memory. The recording is conducted during the processing of the data of the next page. For example, the data of page N is recorded while the data of page $(N+1)$ is processed. As can be seen from FIG. 1, the throughput time required for recording one page depends upon the time required for processing the data of the page. Further, as can be seen from FIG. 1, in the case of the conventional system, the time required for processing one page is the sum of the time required for reading out the data of one page and the time for actually processing the data. This is because reading out the data of one page and processing the data of another page cannot be conducted in parallel in the conventional system.

FIG. 2 is a block diagram of a COM for carrying out the data processing system of the present invention.

In FIG. 2, a computer output read-out unit 1 includes a storage device or magnetic recording tape 2 on which output data from a computer are recorded, a buffer memory 3 and a data processing device 4. The computer output data read out from the magnetic recording tape 2 are stored in the buffer memory 3. The data is stored in and read out from the buffer memory 3 under the control of the data processing device 4. In this system, the data of one page are read out from the magnetic recording tape 2 in only one lot and stored in the buffer memory 3 in only one lot as shown in FIG. 3. The data of the page stored in the buffer memory 3 are transferred to a CPU 5 and stored in a buffer memory 6 thereof. The CPU 5 further includes a data processing unit 7 for processing the data read out from the buffer memory 6 on a page by page basis. The CPU 5 conducts data processing such as COM editing. The data processing unit 7 controls the entire system, and each component of the system operates independently of the others under the control of the data processing unit 7.

The processed data of one page are stored in a buffer memory 9 of a recording unit (COM) 8. The data stored in the buffer memory 9 are read therefrom on a line by line basis, and are recorded on a microfilm device 10 by means of a laser beam scanning recorder, or an optical recording device using a CRT.

As shown in FIG. 3, in the data processing system of the present invention, recording of the data of page (N) in the recording unit 8, processing of the data of page (N+1) in the CPU 5 and read-out of the data of page (N+2) in the computer output read-out unit 1 are conducted in parallel. Therefore, the time required for processing data of one page is not determined by the sum of the time for reading out the data of the page from the magnetic recording tape 2 and the time for actually processing the data in the CPU, but is determined only by the longer one of the times. Accordingly, the throughput time of the entire system can be markedly decreased. Further, the operational speed of the recording unit 8 can be increased with the shortened processing time.

The data processing device 4 of the computer output read-out unit 1 may be a microcomputer which is economically advantageous. It is preferred that the microcomputer be programmed to conduct different types of data processing (such as deblocking or inversion processing) in accordance with the type of data in magnetic recording tape.

The operation of making the computer output read-out unit 1 share a part of the data processing operation is effective, especially when the data processing operation in the CPU 5 (such as COM editing) is complicated and requires a long period of time. Further, with this arrangement, the program for the type of data in the magnetic recording tape can be changed independently of the main program.

Finally, by making the computer output read-out unit 1 conduct easy data processing, the load of the CPU can be reduced, whereby the time for processing data can be further shortened. Since this can be accomplished by means of an economical microcomputer, the cost of the data processing system can be lowered, as compared with the conventional data processing system in which the whole processing is conducted by use of an expensive computer.

I claim:

1. A system for processing output data from a computer in a computer output microfilmer, said system comprising a computer output read-out unit having a data processor and a buffer memory for storing the output data from the computer, a central processor unit having a buffer memory, and a recording unit having a buffer memory, said buffer memory of said computer output read-out unit being controlled by said data processor of said computer output read-out unit for reading out the stored output data from the computer, wherein the output data from the computer is divided into pages, and wherein the respective buffer memories of said computer output read-out unit, said central processor unit, and said recording unit store data of corresponding respective pages of the output data, and wherein the recording unit records the data on one page (N), while the central processor unit processes the data of a next page (N+1), and while the buffer memory of the computer output read-out unit stores the data of a subsequent page (N+2).

2. A system as defined in claim 1 wherein said data processor of said computer output read-out unit conducts inversion processing in accordance with the type of output data from the computer.

3. A system as claimed in any one of claims 1 or 2 wherein the output data from the computer is stored on a magnetic recording tape prior to storage in the buffer memory of the computer output read-out unit.

* * * * *